(12) United States Patent
Astigarraga et al.

(10) Patent No.: US 10,084,859 B2
(45) Date of Patent: Sep. 25, 2018

(54) METHOD TO DESIGNATE AND IMPLEMENT NEW ROUTING OPTIONS FOR HIGH PRIORITY DATA FLOWS

(71) Applicant: INTERNATIONAL BUSINESS MACHINES CORPORATION, Armonk, NY (US)

(72) Inventors: Tara Astigarraga, Fairport, NY (US); Christopher V. Derobertis, Hopewell Junction, NY (US); Louie A. Dickens, Tucson, AZ (US); Jose R. Mosqueda Mejia, Puruandiro (MX); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 14/605,336

(22) Filed: Jan. 26, 2015

(65) Prior Publication Data
US 2016/0218970 A1    Jul. 28, 2016

(51) Int. Cl.
*H04L 12/703* (2013.01)
*H04L 29/08* (2006.01)

(52) U.S. Cl.
CPC .................. *H04L 67/1097* (2013.01)

(58) Field of Classification Search
CPC ................. H04L 45/54; H04L 49/30
USPC ........................................................... 370/419
See application file for complete search history.

(56) References Cited

U.S. PATENT DOCUMENTS

| | | | | |
|---|---|---|---|---|
| 5,617,421 | A | * | 4/1997 | Chin ................... H04L 12/1854 370/402 |
| 6,532,212 | B1 | | 3/2003 | Soloway et al. |
| 6,819,654 | B2 | | 11/2004 | Soloway et al. |
| 6,950,428 | B1 | * | 9/2005 | Horst ..................... H04L 45/00 370/389 |
| 7,324,552 | B1 | * | 1/2008 | Galand ............... H04L 12/5602 370/468 |
| 8,160,072 | B1 | * | 4/2012 | Gnanasekaran .... H04L 47/2441 370/229 |
| 9,270,580 | B1 | * | 2/2016 | Abraham ................ H04L 45/28 |
| 2003/0118053 | A1 | * | 6/2003 | Edsall ................ H04L 12/4641 370/474 |
| 2004/0024906 | A1 | * | 2/2004 | Valdevit .................. H04L 45/12 709/241 |
| 2005/0281196 | A1 | * | 12/2005 | Tornetta .................. H04L 45/00 370/235 |

(Continued)

OTHER PUBLICATIONS

Internet Society et al., "Fibre Channel Routing Information MIB", Sep. 15, 2006, An IP.com Prior Art Database Technical Disclosure; http://ip.com/IPCOM/000140606D.

(Continued)

*Primary Examiner* — Edan Orgad
*Assistant Examiner* — Emmanuel Maglo
(74) *Attorney, Agent, or Firm* — Griffiths & Seaton PLLC

(57) ABSTRACT

A method for routing data in a complex Storage Area Network (SAN) by a processor device is provided, and comprises in exchange based routing, reserving certain predefined Inter-Switch Links (ISLs) for use in routing certain predefined input/output (I/O) traffic across the SAN, such that the routing of other input/output (I/O) traffic remains unaffected and unchanged, the predefined input/output (I/O) traffic being subject to a specified path.

21 Claims, 4 Drawing Sheets

(56) References Cited

U.S. PATENT DOCUMENTS

| | | | |
|---|---|---|---|
| 2008/0008202 A1* | 1/2008 | Terrell | H04L 45/00 370/401 |
| 2010/0214950 A1* | 8/2010 | Vobbilisetty | H04L 45/02 370/254 |
| 2011/0090804 A1* | 4/2011 | Wusirika | H04L 41/0806 370/252 |
| 2011/0110381 A1* | 5/2011 | Atkinson | H04L 47/125 370/419 |
| 2011/0216769 A1* | 9/2011 | Lakshmanan | H04L 12/56 370/392 |
| 2011/0225303 A1* | 9/2011 | Engebretson | H04L 47/193 709/227 |
| 2011/0286357 A1* | 11/2011 | Haris | H04L 12/462 370/254 |
| 2013/0028094 A1* | 1/2013 | Gao | H04L 47/724 370/238 |
| 2014/0010077 A1 | 1/2014 | Busch et al. | |
| 2014/0198793 A1* | 7/2014 | Allu | H04L 45/245 370/392 |
| 2016/0088083 A1* | 3/2016 | Bharadwaj | H04L 43/02 709/217 |

OTHER PUBLICATIONS

Internet Society et al., "MIB for Fibre Channel's Fabric Shortest Path First (FSPF) Protocol", Sep. 15, 2006, An IP.com Prior Art Database Technical Disclosure; http://ip.com/IPCOM/000140607D.

* cited by examiner

US 10,084,859 B2

METHOD TO DESIGNATE AND IMPLEMENT NEW ROUTING OPTIONS FOR HIGH PRIORITY DATA FLOWS

BACKGROUND OF THE INVENTION

Field of the Invention

The present invention relates in general to computing systems, and more particularly, to various embodiments for routing data in complex computer networks.

Description of the Related Art

Today with modern technology, large volumes of data are storable on disk drives; these drives can exist as a solo entity, or as part of a broader make up within a larger storage environment, for example as part of a Storage Area Network (SAN). As the sheer volume of data in today's information-based society continues to increase, so too does the demands placed on communications and data processing infrastructures that serve to manipulate, transfer, and otherwise handle this data.

SUMMARY OF THE INVENTION

Complex SAN configurations enable large numbers of computing components such as servers to access common storage via interconnection switches and cabling. The availability, integrity and recovery of these interconnections is critical to the reliable operations of the systems. Within these interconnected switches, data routing decisions are based on Inter-Switch Link (ISL) routing algorithms.

For a majority of fibre channel traffic traveling across these complex SAN environments, in-order delivery is required of the frames being sent. Traditionally, switches guarantee this in-order delivery by assigning a single path between the communicating devices in any given exchange. This method of routing is referred to as "exchange based routing", and is the default mode configuration in many switches by different manufacturers.

Exchange based routing spreads traffic across Inter-Switch Link's (ISLs) based on fibre channel exchanges, ensuring that all associated frames in a given exchange are sent across the same ISL hops for each given path option from initiator to target, or put simply, that each of the frame(s) in any one exchange follow the same path through the environment. Any given initiator to target path may have dozens to hundreds of ISL choices from destination to target in a given exchange.

Conventionally, ISL decisions, or decisions of the path data may take for a given exchange through the switching environment, are made based upon the available options varying with each manufacturer, when configuring a SAN, or VSAN. Within the choices of switch manufacturers of today, however, there is no current option to configure ISL paths to be utilized only by a select pairing of initiator to target pairs. Stated differently, there is no current configuration option to manually select the path data may take through the SAN environment for a given pair of initiator to target pairs.

Consider the following example. In a large complex SAN environment, any number of exchanges may be occurring at any one time. Some exchanges may be more vital or urgent than others, such as a specific host in communication with a specific storage device that is mission critical. No method exists in current infrastructure to configure a manual path for only those specific source and destination pairs without creating a unique environment (i.e. VSAN). Creating a unique environment, such as a VSAN, for use only in such exchanges has significant disadvantages, including additional storage port requirements, and complex VSAN design implementation across ISLs/IVRs across the environment. Additionally, the use of VSAN traffic isolation methods are a solution that do not scale to suit large environments, the implementation thereof in cases of many distinct communicative pairs being entirely impractical.

In view of the aforementioned, and to address the challenges previously noted, various embodiments for routing data in a complex Storage Area Network (SAN) are provided. In one such embodiment, a method for routing data in a complex Storage Area Network (SAN) by a processor device comprises, in exchange based routing, reserving certain predefined Inter-Switch Links (ISLs) for use in routing certain predefined input/output (I/O) traffic across the SAN, wherein the routing of other input/output (I/O) traffic remains unchanged, the predefined input/output (I/O) traffic being subject to a specified path.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
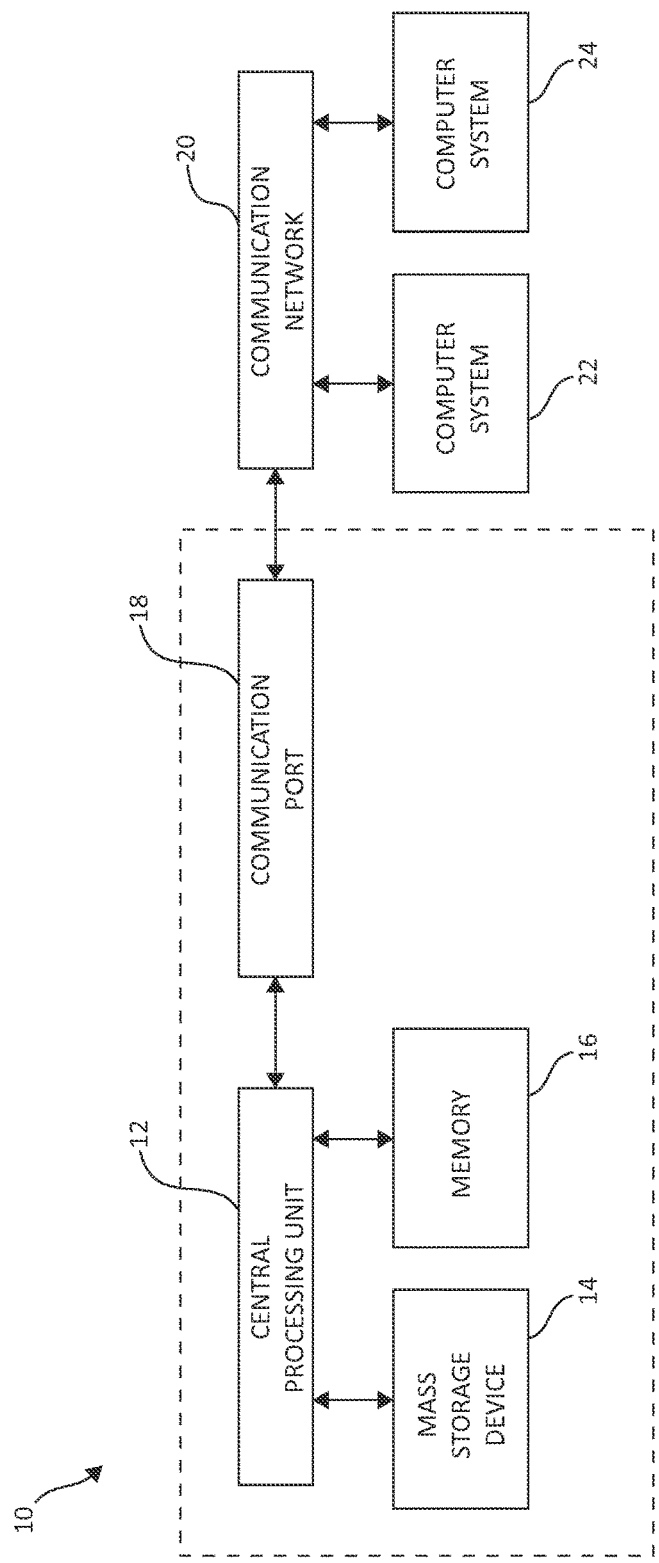
FIG. 1 illustrates a block diagram showing an exemplary hardware structure for effecting management of multipath I/O, in which aspects of the present invention may be realized.

Described embodiments, and illustrative Figures for a method to designate and implement new routing options for high priority data flows are to follow. In the interest of clarity, not all features of an actual implementation are described in this Specification. It will of course be appreciated by the skilled artisan, that in the development of any such actual embodiment, numerous implementation-specific decisions must be made to achieve the developers specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

As previously mentioned, complex SAN configurations enable large numbers of computing components such as servers to access common storage via interconnection switches and cabling. The availability, integrity and recovery of these interconnections is critical to the reliable operations of the systems. Networks are often implemented with redundant routes, in conjunction with server multipath drivers allowing for failing commands to be recovered down alternate paths and avoiding outages and individual path failures.

For a majority of fibre channel traffic traveling across these complex SAN environments, in-order delivery is required of the frames being sent. Traditionally, switches guarantee this in-order delivery by assigning a single path between the communicating devices for any given exchange. This method of routing is referred to as "exchange based routing", and is the default mode configuration in many switches by different manufacturers.

Exchange based routing spreads traffic across Inter-Switch Link's (ISLs) based on fibre channel exchanges, ensuring that all associated frames in a given exchange are sent across the same ISL hops for each given path option from initiator to target, or put simply, that each frame follows the same path through the environment. Any given initiator to target path may have dozens to hundreds of ISL choices from destination to target in a given exchange.

Conventionally, ISL decisions, or decisions of the path data may take for a given exchange through the switching environment, are made based upon the available options when configuring a SAN, or VSAN. Different switch manufacturers may provide different configuration options. Within the choices of switch manufacturers of today, however, there is no current option to configure ISL paths to be utilized only by a select pairing of initiator to target pairs. Stated differently, there is no current configuration option to manually select the path data may take through the SAN environment for a given pair of initiator to target pairs.

In view of the foregoing, the mechanisms of the illustrated embodiments provide various solutions to the previous challenges for routing data for a given pair of source and destination pairs through specific ISL paths within the environment. These mechanisms include such functionality as reserving certain predefined ISLs for use in routing certain predefined input/output (I/O) traffic across the SAN as will be further described, wherein all other input/output (I/O) traffic within the environment remains unchanged and unaffected, however, the predefined input/output (I/O) traffic being subject to a specified path.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 22, 24 and storage systems, which may include storage devices 14. The storage systems may include hard disk drive (HDD) devices, solid-state devices (SSD) etc., which may be configured in a redundant array of independent disks (RAID).

The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22, 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
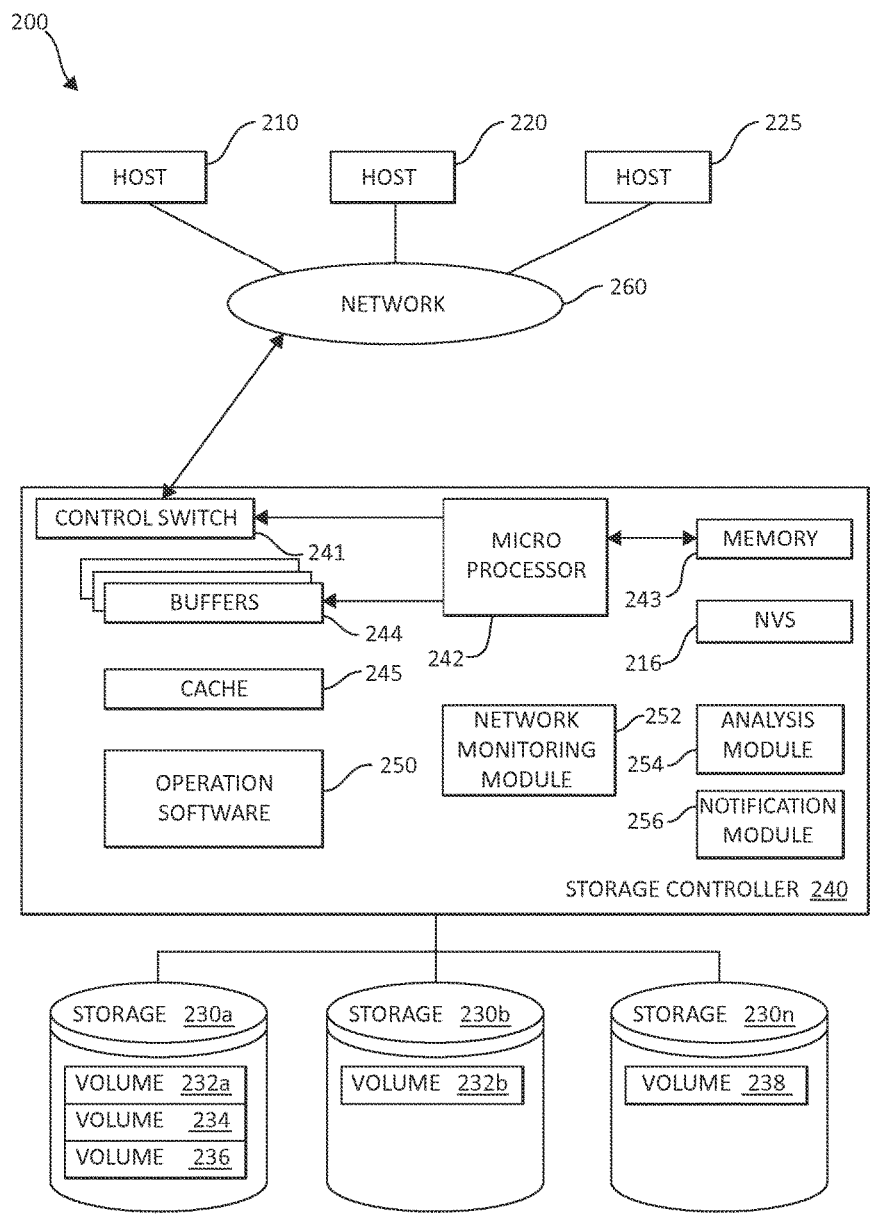
FIG. 2 illustrates an additional block diagram of an additional exemplary hardware structure, specifically portions of a complex SAN, again, in which aspects of the present invention may be realized.

FIG. 2 is an exemplary block diagram 200 showing a hardware structure of a data storage and management system (specifically, portions of a SAN 200) that may be used in the overall context of performing multipath I/O management in accordance with the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes and other network components known to one of ordinary skill in the art.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein)

may be comprised of one or more storage devices, such as storage arrays, which are connected to storage controller 240 (by a storage network) with one or more cluster hosts 210, 220, and 225 connected to each storage controller 240 through network 260. While one data connection between components (such as between storage 230 and storage controller 240, and network connection 260 and cluster hosts 210, 220, and 225) is shown for purposes of brevity, one of ordinary skill in the art will appreciate that a number of network connections, or "paths" may be found in a particular system or scenario in which data is transferred. These paths form the multipath architecture of storage networks in which the mechanisms of the present invention are concerned, among other aspects. In addition, alternate network paths appreciated by one of ordinary skill in the art may be found.

Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as a hard disk, magnetic tape, solid-state flash memory, or other non-volatile memory or any combination thereof. Additionally, Storage 230 may be physically comprised of one or more storage devices such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include operation software 250, a network monitoring module 242, an analysis module 254, and a notification module 256. The operation software 250, network monitoring module 242, analysis module 254, and notification module 256 may work in conjunction with each and every component of the storage controller 240, the hosts 210, 220, 225, and storage devices 230. The operation software 250, network monitoring module 242, analysis module 254, and notification module 256 may be structurally one complete module or may be associated and/or included with other individual modules. The operation software 250, network monitoring module 242, analysis module 254, and notification module 256 may also be located in the cache 245 or other components of portion 200.

The operation software 250, network monitoring module 242, analysis module 254, and notification module 256 may individually and/or collectively perform various aspects of the present invention as will be further described. For example, the operation software 250 may contain executable code for performing network test and evaluation functionality. The network monitoring module 252 may implement one or more monitoring processes. The network monitoring module 252 may monitor individual SAN components and/or data transmission between SAN components. For example, network monitoring module 252 may monitor data exchanges across particular data communication paths. The analysis module 254 may be used to configure certain predefined Inter-Switch Links (ISLs) for use in routing certain predefined input/output (I/O) traffic across the SAN as will be further described. Finally, the notification module 256 may send notification messages to other components in the portion 200 or elsewhere about various network status or multipath management actions taken.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, and other components in the storage controller 240. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In view of the exemplary hardware structures depicted in FIGS. 1 and 2 previously, the mechanisms of the present invention may, as one of ordinary skill in the art will appreciate, be implemented and/or utilized in a wide variety of physical locations including, but not limited to Host-Bus Adapters (HBAs), Converged Network Adapters (CNAs), switch ports, storage ports, and the like.

The mechanisms of the illustrated embodiments, among other functionality, implement new methodologies to route data through specific ISL paths within a complex SAN environment. The advantages of these methodologies include, among others, a technique to route data within a communicative pair of source and destination devices through a predefined route within the environment. Stated differently, communications from devices such as a specific host to specific target storage device that are mission critical, may be isolated to take a specified path within the environment, whilst other traffic and traffic routes remain unaffected and unchanged.

Figure 3:
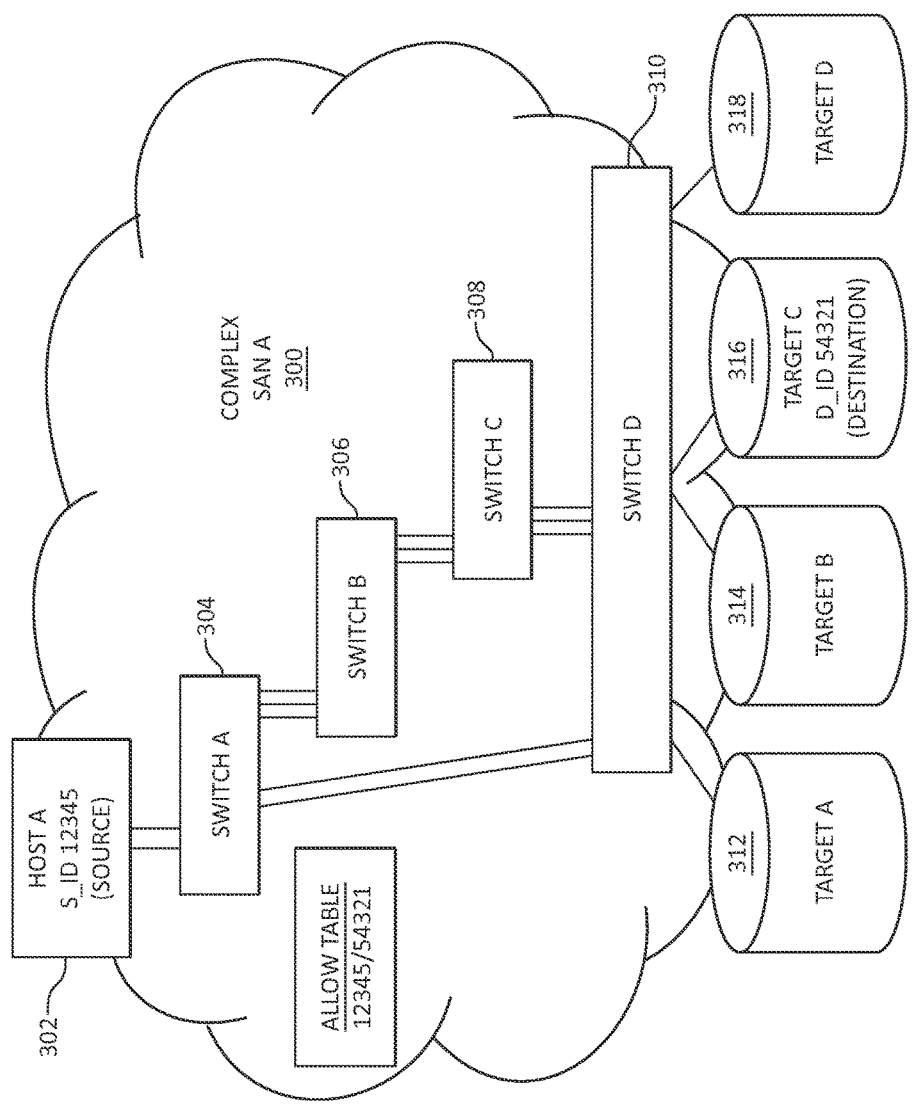
FIG. 3 illustrates an additional block diagram of yet an additional exemplary hardware structure, specifically portions of a complex SAN, here again, in which aspects of the present invention may be realized.

Turning now to FIG. 3, which illustrates a simplistic complex SAN environment 300 in which the present invention may be realized, one example of one embodiment of the present invention will be explored. The SAN environment 300 includes Host A 302, which is exchanging input/output (I/O) traffic with Target A 312, Target B 314, Target C 316, and Target D 318, through a series of switches, Switch A 304, Switch B 306, Switch C 308, and Switch D 310. In this example, Host A 302 (source ID 12345) is zoned and exchanging I/O traffic with the four target devices, Target A 312, Target B 314, Target C 316, and Target D 318. For the purposes of this example, Host A 302 sends daily mission critical reports to Target C 316 (destination ID 54321). Under conventional methods, I/O traffic exchanged between Host A 302 and Target C 316 may be routed through ISLs in Switch A 304, Switch B 306, Switch C 308, and Switch D 310, before finally arriving at Target C 316.

Under the implementation of one embodiment of the present invention, using the aforementioned example wherein I/O traffic exchanged between Host A 302 and Target C 316 is more critical than other I/O traffic being exchanged in the SAN environment 300, Host A 302 may utilize a specified, predefined route through the SAN environment 300. In one embodiment, Host A 302 may be configured to exchange I/O traffic with Target C 316 using the most expeditious route. In this example, the most expeditious route would be to route I/O traffic from Host A 302 to Switch A 304 to Switch D 310 to Target C 316.

One significant benefit of the present invention is the ability to allow only certain I/O traffic exchanges to utilize specified routes. In other words, Host A 302 is able to exchange I/O traffic conventionally using ISL algorithms already in place, while reserving the ability to conduct specific I/O traffic exchanges over specified routes, or paths. This is accomplished by through the use of Allow Table 320, wherein existing initiator or source, and target or destination IDs are inputted. In a given exchange, Allow Table 320 is consulted; if both the source ID and target ID for that particular exchange are listed on Allow Table 320, meaning they were inputted onto Allow Table 320 previously by a user, that particular exchange is directed upon the specified, predefined path. This means that, using the previous example, that only I/O traffic from Host A 302 with a source ID 12345 exchanging I/O traffic with Target C 316 with a destination ID of 54321, which had previously been specified and inputted on Allow Table 320, is able or specified to utilize the predetermined route.

Conversely, as I/O traffic exchanges are bi-directional, the host and target fields within Allow Table 320 would both show as valid combinations within an exchange as the listed source ID and destination ID. In other words, in the above-example, the source ID may be 54321 and the destination ID may be 12345. Inasmuch as the initiator and target are tied together by the inputting of the source ID and destination ID into Allow Table 320, the source ID and destination ID may be interchangeable; I/O traffic exchanged between the two being subject to the specified path. I/O traffic exchanged between Host A 302 and Target C 316, with a source ID of 13245 and a destination ID of 54321 in this case, however, would remain unchanged and unaffected, being routed through the environment using the default routing patterns and algorithms already in place, as the source ID does not match the inputted source ID on Allow Table 320.

Another added benefit of using this technique is the ability to predefine a specific path for each pair of source and target pairs, for each desired I/O traffic exchange. One path desirous for a particular I/O traffic exchange may be the most expeditious route. In another exchange example, it may be the least volatile.

The implementation of the present invention into existing computing components is, here again, a significant benefit to the present invention. While possible the aforementioned functionality may be employed into computing components by cross referencing the source and destination IDs of each I/O traffic exchange within the environment against Allow Table 320, this would have a higher overhead and be of lower efficiency. Several effective methods to implement the mechanisms of the present invention exist. One example, of one embodiment, comprises setting a predefined ISL access bit.

In one embodiment of the present invention, upon receipt of a frame, or the first frame in a given I/O traffic exchange, the switch port or software defined entity checks the frame for a designated ISL access bit. One example of a bit that may be used for this purpose may be an outdated and unused priority access bit that currently exists in every Frame Header. Specifically, Word 1, bit 24, Section 12.5.2 Table 35 (priority field), for example, is a bit that may be re-purposed for such use in the present invention. Many alternate implementations exist and may be employed without straying from the scope of the invention, the aforementioned simply provided as a reference model for convenience only.

Figure 4:
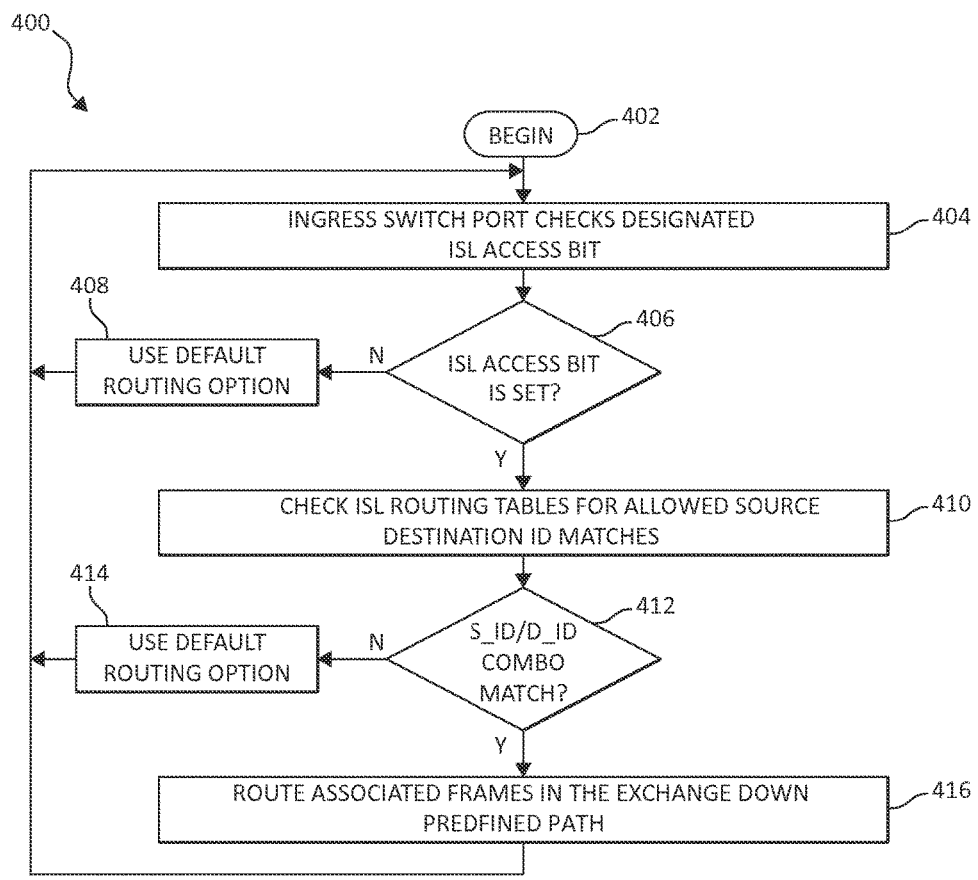
FIG. 4 illustrates a flow chart diagram of an exemplary method for routing data in a complex SAN, again in which aspects of the present invention may be implemented.

Turning to FIG. 4, a flow chart of one example of one embodiment of an implementation of a designated ISL access bit is illustrated 400. The method starts at 402 as I/O traffic flows through a given network. When I/O traffic is received at a switch 404, the Ingress Switch Port checks the frame, or the first frame in the exchange, to determine whether the designated ISL access bit is set 406. If it is determined the ISL access bit is not set, the I/O traffic is routed as normal, or according to the default configuration 408. If it is determined the ISL access bit is set, Allow Table 320 is referenced 410 for source and destination ID matches 412. If it is determined both source and destination IDs do not match previously inputted source and destination IDs written in Allow Table 320, the I/O traffic is routed as normal, or according to the default configuration 414. If it is determined both source and destination IDs match previously inputted source and destination IDs on Allow Table 320, the associated frames in that particular I/O traffic exchange are routed according to the specified, predefined path 416.

The mechanisms of the present invention have been described according to a fibre channel fabric within a complex SAN for convenience and brevity only. In an actual implementation, the functionality of the present invention may be advantageous to other protocols, such as TRILL, Cloud Services, Fabric Path, and many others not listed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for routing data in a complex Storage Area Network (SAN) by a processor device, comprising:
in exchange based routing, reserving certain predefined Inter-Switch Links (ISLs) for use in routing certain predefined input/output (I/O) traffic across the SAN such that the routing of other I/O traffic remains unchanged including when the other I/O traffic uses the certain predefined ISLs in normal course without the other I/O traffic satisfying any preconditions associated with an origin, a destination, and type of data of the other I/O traffic, thereby routing the other I/O traffic according to default routing patterns and algorithms as previously established prior to reserving the certain ISLs; wherein the predefined I/O traffic comprises certain data exchanged between a specific source and target and is subject to a specified path only when being transferred between the specific source and target within the SAN; and
setting a specified access bit within the certain data to indicate the predefined I/O traffic such that the specified access bit triggers the predefined I/O traffic to be transferred through the specified path.

2. The method of claim 1, further including associating the predefined I/O traffic with a predefined high-priority routing table.

3. The method of claim 2, further including assigning a unique source identification and destination identification to the predefined I/O traffic, wherein the source identification and destination identification for I/O traffic desired to take the specified path are input to the high-priority routing table.

4. The method of claim 3, further including:
upon receipt of an incoming I/O traffic frame by a switch, determining if the specified access bit is set;
if the access bit is set, determining, whether the source identification and destination identification of the incoming I/O traffic matches a corresponding predefined source identification and destination identification input on the high-priority routing table; and
if the corresponding source identification and destination identification matches, routing the incoming I/O traffic through the specified predefined ISLs.

5. The method of claim 4, further including routing the I/O traffic conventionally, if the access bit is not set.

6. The method of claim 4, further including routing the I/O traffic conventionally, if the corresponding source identification and destination identification on the I/O traffic and the high-priority routing table do not match.

7. The method of claim 1, wherein the specified path is a most expeditious route.

8. A system for routing data in a complex Storage Area Network (SAN), comprising:
a processor device, wherein the processor device:
in exchange based routing, reserves certain predefined Inter-Switch Links (ISLs) for use in routing certain predefined input/output (I/O) traffic across the SAN such that the routing of other I/O traffic remains unchanged including when the other I/O traffic uses the certain predefined ISLs in normal course without the other I/O traffic satisfying any preconditions associated with an origin, a destination, and type of data of the other I/O traffic, thereby routing the other I/O traffic according to default routing patterns and algorithms as previously established prior to reserving the certain ISLs; wherein the predefined I/O traffic comprises certain data exchanged between a specific source and target and is subject to a specified path only when being transferred between the specific source and target within the SAN; and
sets a specified access bit within the certain data to indicate the predefined I/O traffic such that the specified access bit triggers the predefined I/O traffic to be transferred through the specified path.

9. The system of claim 8, wherein the processor device associates the predefined I/O traffic with a predefined high-priority routing table.

10. The system of claim 9, wherein the processor device assigns a unique source identification and destination identification to the predefined I/O traffic, wherein the source identification and destination identification for I/O traffic desired to take the specified path are input to the high-priority routing table.

11. The system of claim 10, wherein the processor device:
upon receipt of an incoming I/O traffic frame by a switch, determines if the specified access bit is set;
if the access bit is set, determines, whether the source identification and destination identification of the incoming I/O traffic matches a corresponding predefined source identification and destination identification input on the high-priority routing table; and
if the corresponding source identification and destination identification matches, routes the incoming I/O traffic through the specified predefined ISLs.

12. The system of claim 11, wherein the processor device routes the I/O traffic conventionally, if the access bit is not set.

13. The system of claim 11, wherein the processor device routes the I/O traffic conventionally, if the corresponding source identification and destination identification on the I/O traffic and the high-priority routing table do not match.

14. The system of claim 8, wherein the specified path is a most expeditious route.

15. A computer program product for evaluating error recovery effectiveness in a complex Storage Area Network (SAN) by a processor device, the computer program product comprising a non-transitory computer-readable storage medium having computer-readable program code portions stored therein, the computer-readable program code portions comprising:
a first executable portion that:
in exchange based routing, reserves certain predefined Inter-Switch Links (ISLs) for use in routing certain predefined input/output (I/O) traffic across the SAN such that the routing of other I/O traffic remains unchanged including when the other I/O traffic uses the certain predefined ISLs in normal course without the other I/O traffic satisfying any preconditions associated with an origin, a destination, and type of data of the other I/O traffic, thereby routing the other I/O traffic according to default routing patterns and algorithms as previously established prior to reserving the certain ISLs; wherein the predefined I/O traffic comprises certain data exchanged between a specific source and target and is subject to a specified path only when being transferred between the specific source and target within the SAN; and
a second executable portion that sets a specified access bit within the certain data to indicate the predefined I/O traffic such that the specified access bit triggers the predefined I/O traffic to be transferred through the specified path.

16. The computer program product of claim 15, further including a third executable portion that associates the predefined I/O traffic with a predefined high-priority routing table.

17. The computer program product of claim 16, further including a fourth executable portion that assigns a unique source identification and destination identification to the predefined I/O traffic, wherein the source identification and destination identification for I/O traffic desired to take the specified path are input to the high-priority routing table.

18. The computer program product of claim 17, further including a fifth executable portion that:
   upon receipt of an incoming I/O traffic frame by a switch, determines if the specified access bit is set;
   if the access bit is set, determines, whether the source identification and destination identification of the incoming I/O traffic matches a corresponding predefined source identification and destination identification input on the high-priority routing table; and
   if the corresponding source identification and destination identification matches, routes, the incoming I/O traffic through the specified predefined ISLs.

19. The computer program product of claim 18, further including a sixth executable portion that routes the I/O traffic conventionally, if the access bit is not set.

20. The computer program product of claim 18, further including a sixth executable portion that routes the I/O traffic conventionally, if the corresponding source identification and the destination identification on the I/O traffic and high-priority routing table do not match.

21. The computer program product of claim 15, wherein the specified path is a most expeditious route.

* * * * *